United States Patent
Brizon et al.

(10) Patent No.: US 9,623,620 B2
(45) Date of Patent: Apr. 18, 2017

(54) THREE-DIMENSIONAL REUSEABLE CURING CAUL FOR USE IN CURING INTEGRATED COMPOSITE COMPONENTS AND METHODS OF MAKING THE SAME

(71) Applicant: EMBRAER S.A., São José dos Campos-SP (BR)

(72) Inventors: Fabricio Brizon, São José dos Campos-SP (BR); Lallo Kametada Nou, São José dos Campos-SP (BR)

(73) Assignee: EMBRAER S.A., São José Dos Campos- SP (BR)

( * ) Notice: Subject to any disclaimer, the term of this patent is extended or adjusted under 35 U.S.C. 154(b) by 86 days.

(21) Appl. No.: 14/135,524

(22) Filed: Dec. 19, 2013

(65) Prior Publication Data

US 2015/0174844 A1    Jun. 25, 2015

(51) Int. Cl.
*B29C 43/12* (2006.01)
*B29C 70/34* (2006.01)
*B29D 99/00* (2010.01)
*B29C 70/44* (2006.01)
*B29C 70/30* (2006.01)
*B29C 43/36* (2006.01)
*B29K 21/00* (2006.01)
*B29L 31/30* (2006.01)
*B29K 83/00* (2006.01)
*B29K 105/08* (2006.01)
(Continued)

(52) U.S. Cl.
CPC .......... *B29D 99/0014* (2013.01); *B29C 43/12* (2013.01); *B29C 43/3642* (2013.01); *B29C 70/30* (2013.01); *B29C 70/34* (2013.01); *B29C 70/44* (2013.01); *B29C 2043/3644* (2013.01); *B29C 2043/3655* (2013.01); *B29K 2021/006* (2013.01); *B29K 2083/005* (2013.01); *B29K 2105/0872* (2013.01); *B29K 2105/24* (2013.01); *B29K 2821/006* (2013.01); *B29L 2009/00* (2013.01); *B29L 2031/003* (2013.01); *B29L 2031/3076* (2013.01); *Y10T 156/14* (2015.01)

(58) Field of Classification Search
CPC .... B29C 2043/3655; B20C 2043/3655; B29D 99/0003; B29D 99/0007; B29D 99/001; B29D 99/0014; B29D 99/0017
See application file for complete search history.

(56) References Cited

U.S. PATENT DOCUMENTS 7,854,874 B2 * 12/2010 Martin .................... B29C 33/40
249/82
2003/0228819 A1 * 12/2003 Vito et al. ..................... 442/169
(Continued)

OTHER PUBLICATIONS

Campbell, F.C., Structural Composite Materials, 2010, pp. 116-117 and 122-133.*
(Continued)

*Primary Examiner* — William Bell
(74) *Attorney, Agent, or Firm* — Nixon & Vanderhye P.C.

(57) ABSTRACT

Curing cauls formed of a one-piece three-dimensional resiliently shape-retentive fiber-reinforced body are provided, whereby the body includes a fibrous sheet coated with at least one layer of a cured elastomeric resin. The fibrous sheet may be embedded within the cured elastomeric resin, with the body having a stiffened perimetrical edge region and a stiffened ridge region vertically spaced from the edge region.

18 Claims, 7 Drawing Sheets

(51) Int. Cl.
   *B29K 105/24* (2006.01)
   *B29L 31/00* (2006.01)
   *B29L 9/00* (2006.01)

(56) References Cited

U.S. PATENT DOCUMENTS

| | | | |
|---|---|---|---|
| 2008/0166536 A1* | 7/2008 | Kao | 428/292.1 |
| 2013/0299073 A1* | 11/2013 | Piedmont | B29C 70/44 |
| | | | 156/245 |

OTHER PUBLICATIONS

Airtech International Inc., "Aircast 3700 Application Diagrams", lasted updated Aug. 19, 2013, available on-line at http://catalog.airtechintl.com/product_pdf.php?product_id=13&lang=EN&print=1, 1 page.*

Airtech International Inc., "Aircast 3700 Technical Data Sheet", dated Aug. 2015, available on-line at http://catalog.airtechintl.com/product.php?product_id=12&location=2&lang=EN, 2 pages.*

* cited by examiner

THREE-DIMENSIONAL REUSEABLE CURING CAUL FOR USE IN CURING INTEGRATED COMPOSITE COMPONENTS AND METHODS OF MAKING THE SAME

FIELD

The embodiments disclosed herein relate generally to the manufacture of integrated composite components, such as stiffened panels for aircraft. More specifically, the embodiments disclosed herein relate to a three-dimensional shape-retentive curing caul that may be used and reused during co-curing of integrated fiber-reinforced composite components, and to methods of making such caul.

BACKGROUND

Aircraft manufacturers continuously attempt to improve aircraft performance by reducing both weight and manufacturing costs while maintaining or improving structural strength. One well-known method for increasing aircraft performance is to reduce airframe weight through the use of state-of-the-art materials, such as composites, having relatively high strength-to-weight and stiffness-to-weight ratios. Composite materials are generally described as being materials that include reinforcing fibers, such as graphite fibers, embedded in a polymeric matrix, such as an epoxy resin. Such materials will hereinafter be referenced as "fiber-reinforced composite" materials. Fiber-reinforced composite materials are usually supplied as fibrous sheets pre-impregnated with a curable or partially cured resin. The so-called "prepreg sheets" may then be laid up in laminated plies and cured to form rigid panel structures.

Integrated composite structures which comprise elongate stringers or other structural reinforcement members integrated to a skin panel are also being employed in the aircraft industry. Typically, the uncured prepreg sheets forming the stringers are laid up in plies (usually cross-lapped) onto similarly uncured prepreg plies forming a panel preform positioned on suitable support tooling. Once the stringer layers are laid up, suitable mandrel structures may be positioned so as to assist in maintaining the structural form during the subsequent cure process.

The preformed panel and stringer are then typically covered by a removable flexible caul sheet to form a curing assembly. A vacuum bag can then be positioned over the curing assembly with suitable seals placed between the bag and the mold tooling. Curing of the panel and stringer can then be performed at an elevated temperature and typically elevated pressure in an autoclave or oven. After curing all prepreg plies, the vacuum bag and the flexible caul can be removed thereby providing a cured integrated composite panel and stringer component.

One problem associated with the use of a flexible caul during the curing of integrated prepreg layers is that there may sometimes occur non-conforming cure at the edges of the stringer or stiffener adjacent the panel due to improper edge ply compaction. It is towards addressing such problem that the embodiments of the present invention as described herein are directed.

SUMMARY

In general, the embodiments disclosed herein related to curing cauls formed of a one-piece three-dimensional resiliently shape-retentive fiber-reinforced body. The body will preferably include a fibrous sheet coated with at least one layer of a cured elastomeric resin. The fibrous sheet may be embedded within the cured elastomeric resin, with the body having a stiffened perimetrical edge region and a stiffened ridge region vertically spaced from the edge region. Resiliently compliant sides are provided between the ridge and edge regions.

According to some embodiments, the elastomeric resin is a room temperature vulcanizing (RTV) silicone rubber, more specifically a RTV silicone rubber having a coefficient of thermal expansion when cured of at least $1.0 \times 10^{-4}/°C$.

The curing caul may be made by a method which includes applying an initial layer of a curable elastomeric resin to exterior surfaces of a three-dimensional model having a desired cross-sectional profile, applying a dry fibrous sheet over the initial layer of curable elastomeric resin, applying at least one additional layer of a curable elastomeric resin onto the fibrous sheet, and curing the elastomeric resin to form a three-dimensional resiliently shape-retentive curing caul. Once cured, the curing caul may be removed from the model and the perimetrical edges thereof may be trimmed to desired dimensions.

The curing cauls as described herein may be used in a fabricating process to form a fiber-reinforced composite component by positioning the curing caul over a preform composite component comprised of uncured or at most partially cured fiber reinforced resin composite plies, and thereafter subjecting the preform composite component to curing conditions. A vacuum bag may be positioned over the preform composite component and subjecting the preform composite component to vacuum during curing.

The caul will undergo volume expansion during high temperature curing of the composite component to an extent that sufficient additional pressure is exerted against the composite preform during curing. In such a manner, therefore, this volume expansion of the caul will thus reduce (if not eliminate entirely) post-cure edge non-conformance of the stringer or other stiffener that is observed with the use of conventional flexible caul sheets.

These and other aspects and advantages of the present invention will become more clear after careful consideration is given to the following detailed description of the preferred exemplary embodiments thereof.

BRIEF DESCRIPTION OF ACCOMPANYING DRAWINGS

The disclosed embodiments of the present invention will be better and more completely understood by referring to the following detailed description of exemplary non-limiting illustrative embodiments in conjunction with the drawings of which:

DETAILED DESCRIPTION

Figure 1:
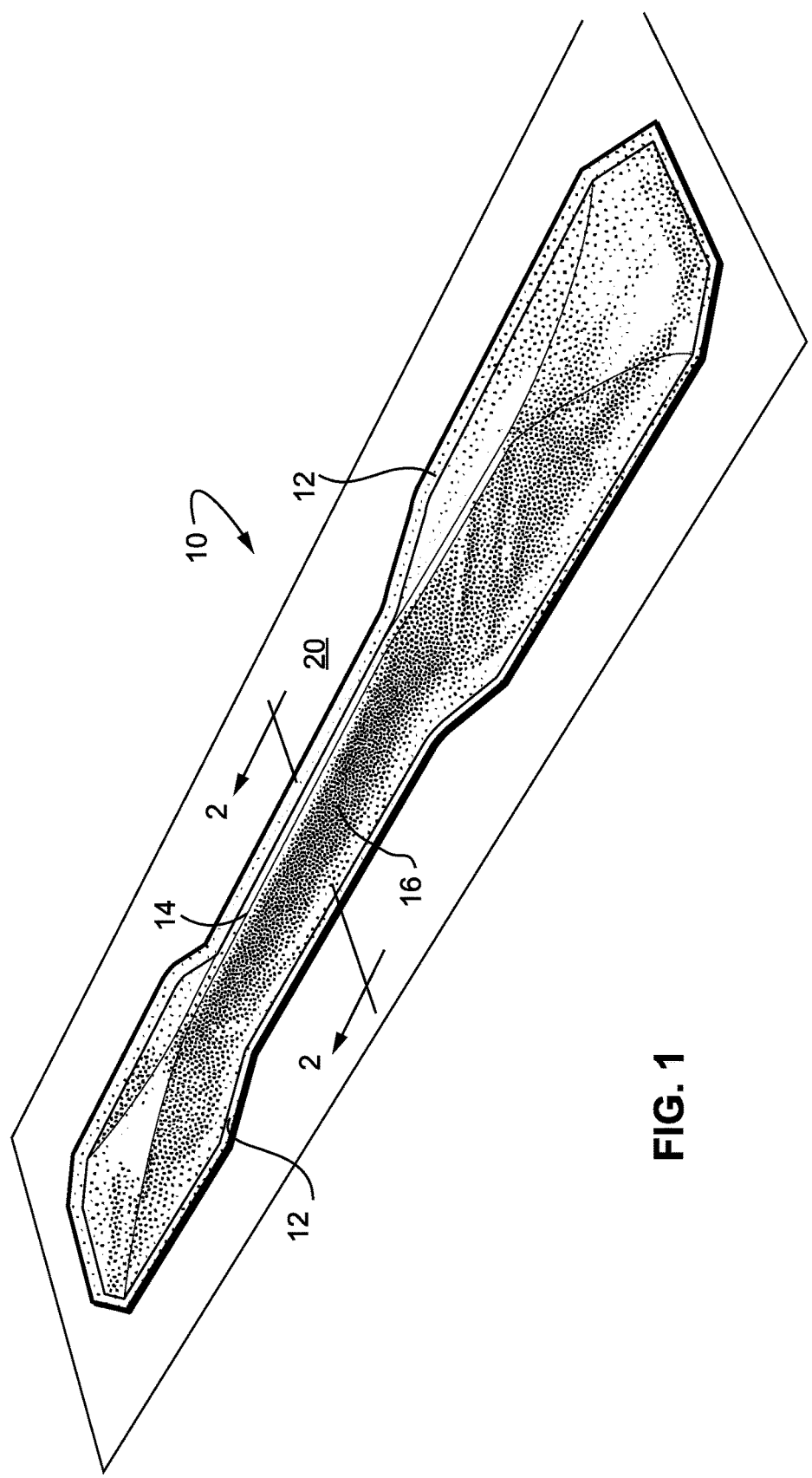
FIG. 1 is perspective view of the three-dimension resiliently shape-retentive caul in accordance with an embodiment of the present invention.
Figure 2:
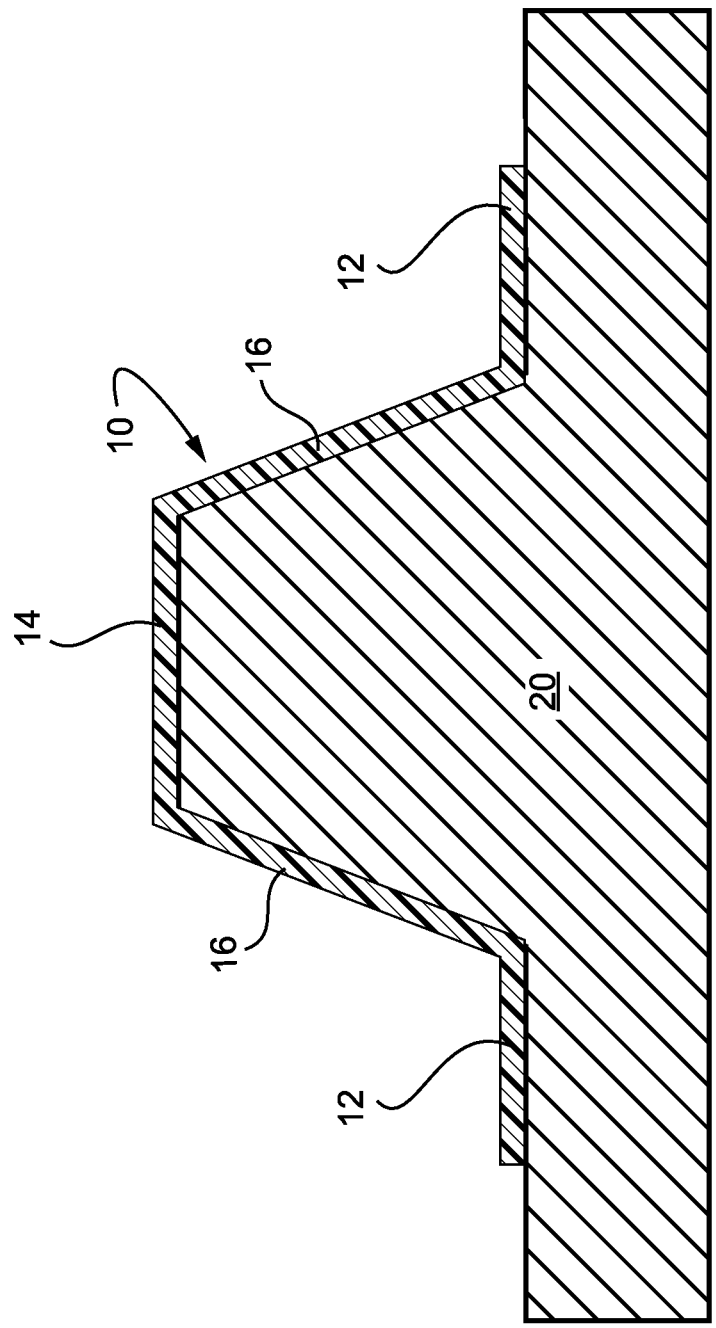
FIG. 2 is a cross-sectional elevational view of the caul depicted in FIG. 1.

Accompanying FIGS. 1 and 2 depict a three-dimensional resiliently shape-retentive curing caul 10 that has a representative cross-sectional shape and profile for use in forming an integrated fiber-reinforced composite structure. In this regard, it will be observed that the caul 10 is formed of a one-piece sheet-like body to be described in greater detail below) having a stiffened shape-retaining perimetrical planar lower edge region 12 and an elongate stiffened shape-retaining upper ridge region 14 which is vertically spaced from the plane of the edge region 12. Resilient compliant side walls 16 thereby extend between the stiffened upper ridge and lower edge regions.

Figure 3:
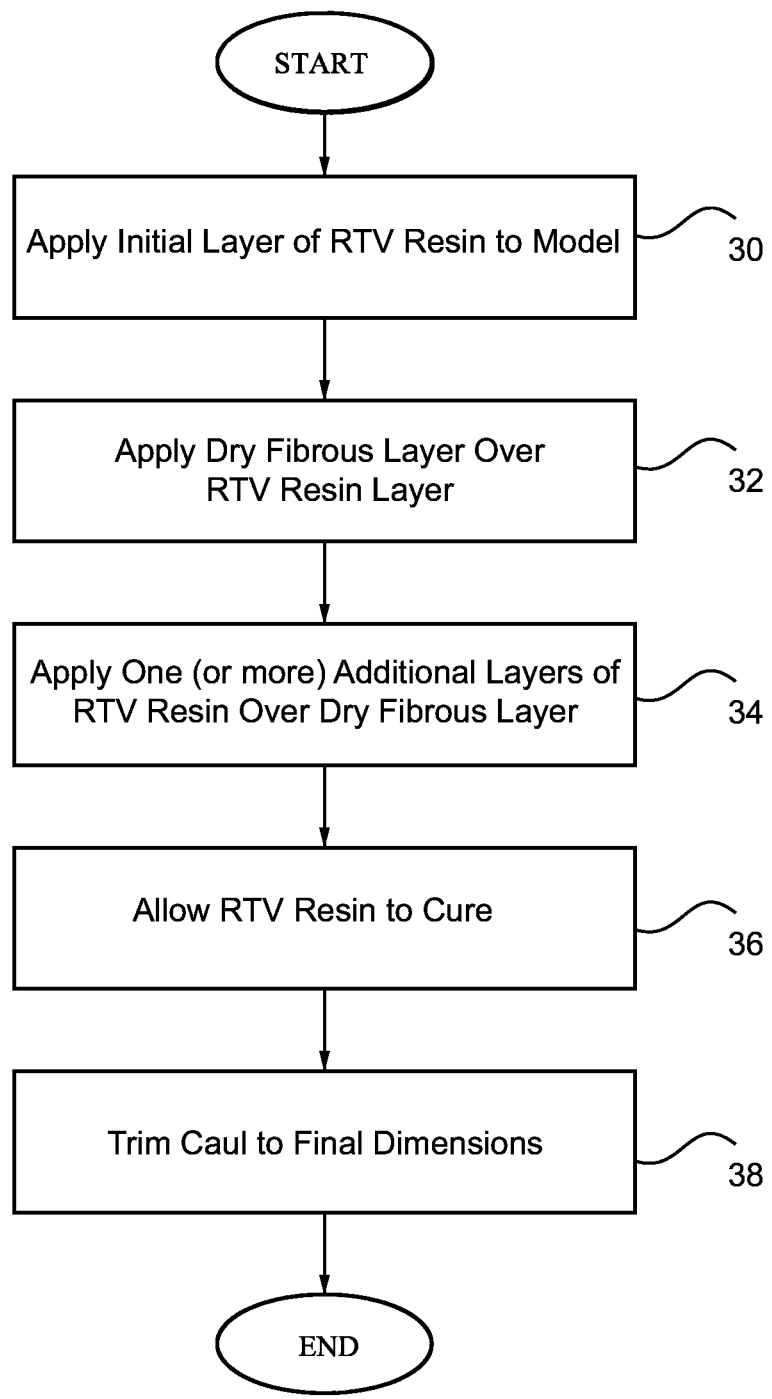
FIG. 3 is a schematic block diagram of the steps to form the caul depicted in FIG. 1.
Figure 4:
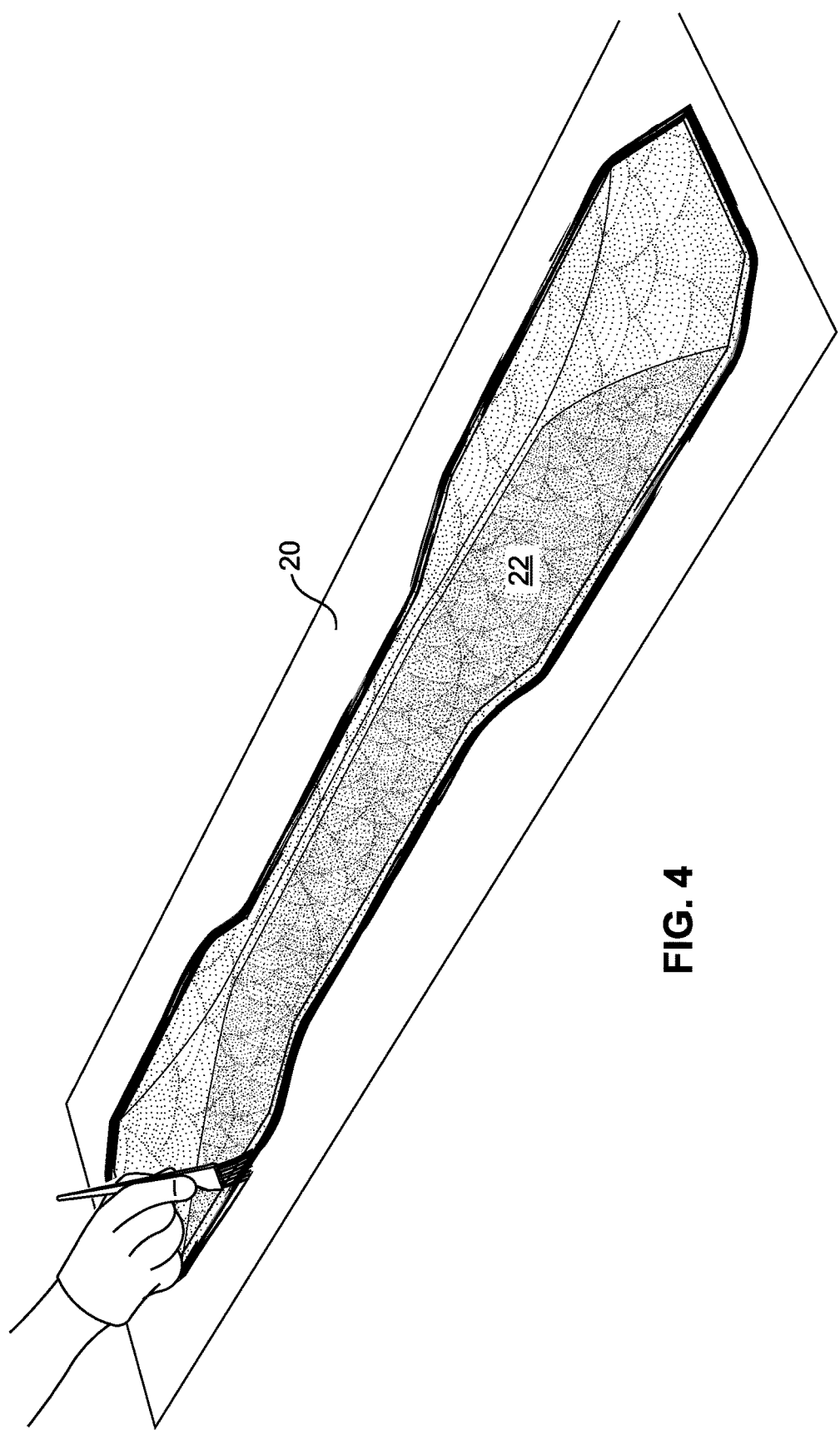
FIGS. 4-6 are respective schematic views showing a manufacturing sequence for forming the caul as depicted in FIG. 1.
Figure 5:
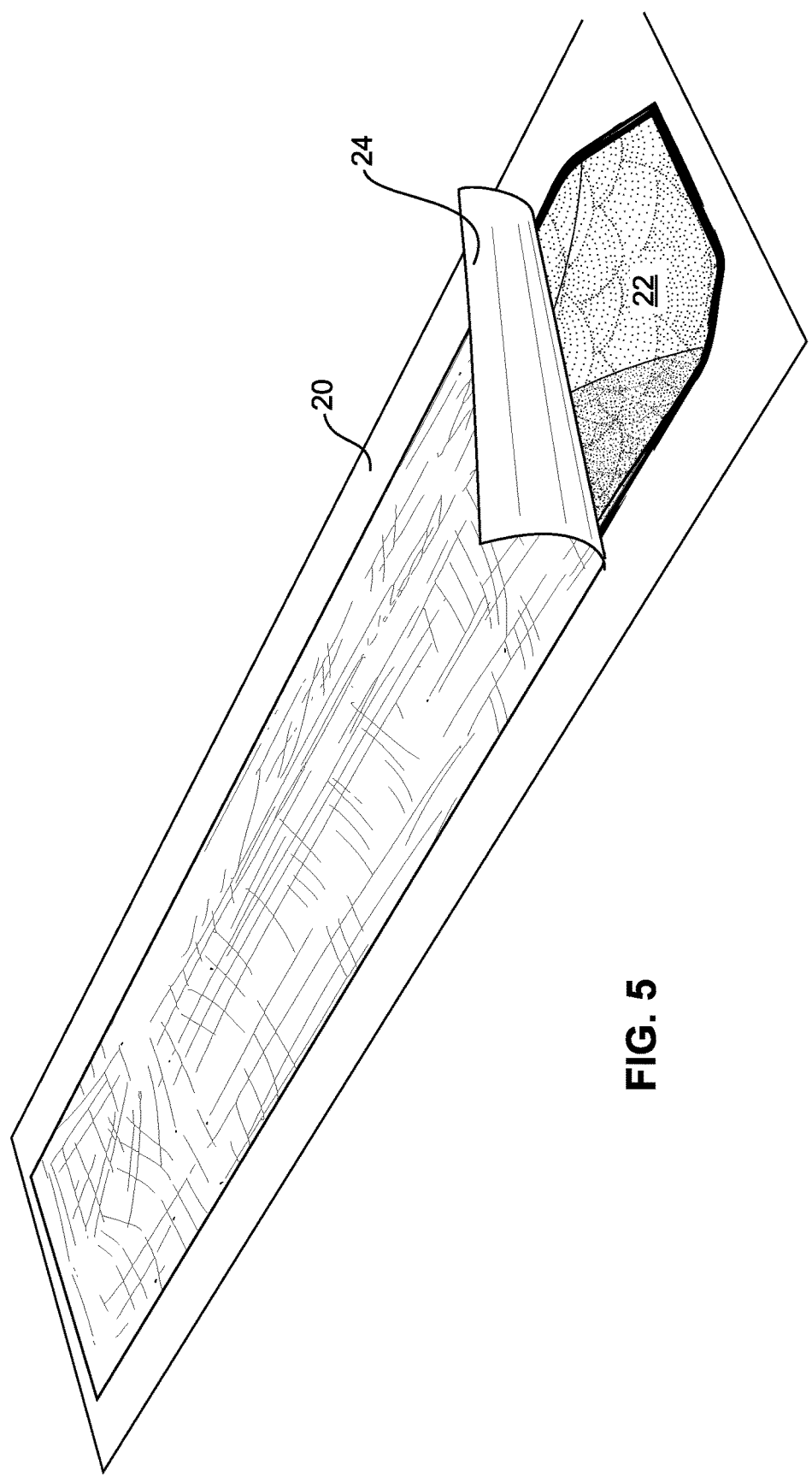
Figure 6:
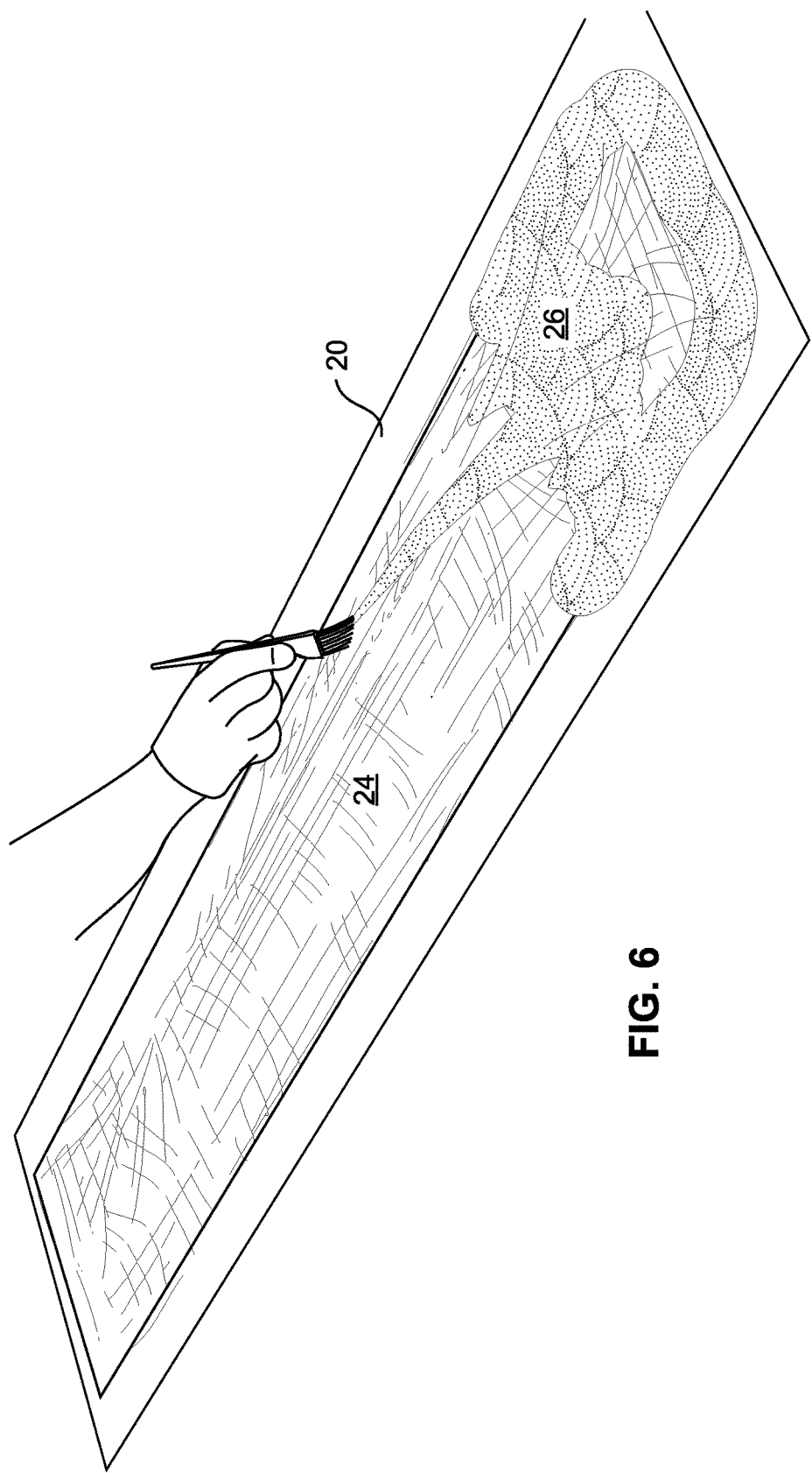

FIG. 3 is a schematic block diagram of the manufacturing steps employed to form the curing caul 10, while FIGS. 4-6 schematically depict some of the process steps. In this regard, the first step 30 of the manufacturing process to form caul 10 involves coating a forming model 20 with an initial layer of a substantially room temperature (e.g., between about 20 to about 25° C.) curable elastomeric resin. Such a step 30 is visualized in FIG. 4. The model 20 will necessarily provide substantially the same cross-sectional profile required for the co-curing of a panel and stringer assembly that will be required for the caul 10 during use.

Preferably, the resin forming layer 22 is a room temperature vulcanizing (RTV) silicone rubber material. One preferred RTV silicone rubber material that may be used satisfactorily in the practice of the present invention is AIRCAST® 3700 RTV high temperature casting compound commercially available from Airtech International, Inc. Such a material is advantageous for use in the caul 10 as it exhibits a sufficient coefficient of thermal expansion. As such, the caul 10 will undergo volume expansion during high temperature curing of the composite component to an extent that sufficient additional pressure is exerted against the composite preform during curing. In such a manner, therefore, this volume expansion of the caul 10 will thus reduce (if not eliminate entirely) post-cure edge non-conformance of the stringer or other stiffener that is observed with the use of conventional flexible caul sheets. Preferably, the elastomeric material will exhibit a coefficient of thermal expansion of at least $1.0 \times 10^{-4}/°$ C., more preferably about $2.5 \times 10^{-4}/°$ C. up to about $1.0 \times 10^{-3}/°$ C.

Once the initial coating 22 of the elastomeric resin has been applied to the surfaces of the mold 20 and during a period of time that the resin of layer 22 remains uncured, a dry fibrous reinforcement sheet 24 may then be placed onto the model 20 in step 32 in such a manner that the sheet conforms to the exterior surfaces of the model 20. Such a step 32 is visualized in FIG. 5. In preferred forms, the reinforcement sheet 24 is a sheet of plain woven glass fibers that is conventionally employed in the manufacture of fiber reinforced composite materials. The reinforcement sheet 24 will therefore be adhered to the contours of the model 20 by means of the uncured resin layer 22.

Thereafter in step 34, one or more additional layers 26 of elastomeric resin may be applied onto the reinforcement sheet 24 so that the sheet 24 ultimately becomes substantially embedded within (e.g., substantially saturated by) the RTV resin layers 22 and 26. Such a step 34 is visualized in progress by FIG. 6. The thus formed resin-impregnated reinforcement sheet conforming to the contours and cross-sectional profiles of the model 20 may then be allowed to cure in step 36. Once cured, the fibrous reinforced elastomeric material may be trimmed to final perimetrical dimensions as may be required in step 38 to thereby form the caul 10 conforming to the cross-sectional profile of the model 20. The final caul 10 will thus have a perimetrical stiffened (but rubberized) shape-retaining edge region 12 and a stiffened (but rubberized) upper ridge region 14. The side walls 16 of the caul 10 will likewise be rubberized.

The curing caul 10 will therefore be shape-retentive and resiliently flexible. That is, due to the cured elastomeric resin of layers 22 and 26 which impregnate the fibrous reinforcement sheet 24 as described previously, the entire caul 10 will be rubberized to an extent that it can be flexibly bent and/or contorted, but will return resiliently to its original shape once bending and/or contortion forces have been removed. As such, the caul 10 is retains its three-dimensional shape as established by the model 20.

Figure 7:
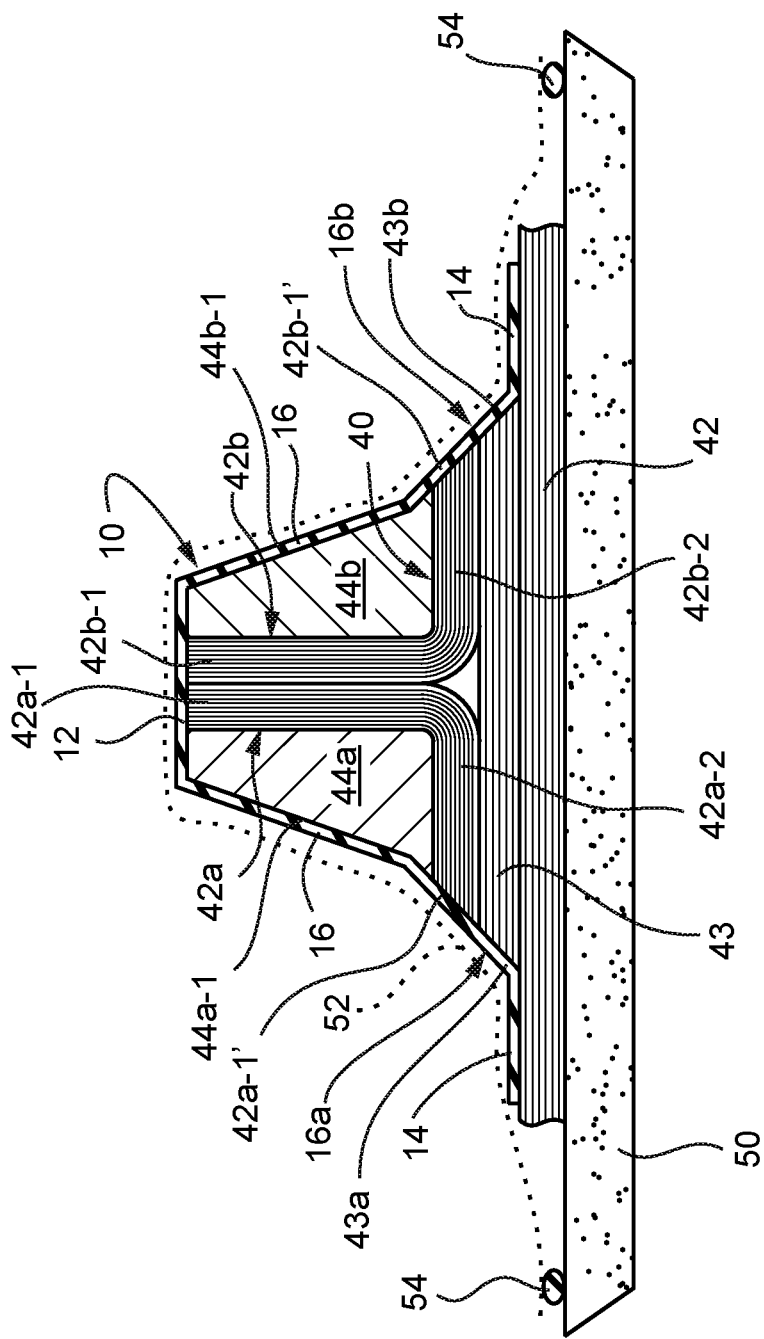
FIG. 7 is a schematic cross-sectional view showing the manner in which the caul is used in the co-curing of a preformed panel and stringer assembly.

A schematic cross-sectional view of the caul 10 in use during co-curing of an integrated composite component 40 formed of a base panel 42 and an intermediate panel 43 formed of fiber-reinforced plies on suitable tooling 50 and mirror image L-shaped stringers 42a, 42b of fiber-reinforced plies forming upright leg sections 42a-1, 42b-1 and lower leg sections 42a-2, 42b-2, respectively. The lower leg sections 42a-2, 42b-2 are positioned on the panel 43 such that the upright leg sections 42a-1 and 42b-1 are positioned adjacent one another and extend outwardly from the panel 43. A pair of mirror image curing mandrels 44a, 44b having downwardly and outwardly inclined exterior surfaces 44a-1, 44b-1, respectively, is positioned to provide support to the L-shaped stringers 42a, 42b during the curing process. As depicted in FIG. 7, each of the lower leg sections 42a-2, 42b-2 of the L-shaped stringers 42a, 42b will have opposed beveled lateral edges 42a-2', 42b-2' exposing the individual plies thereof. Similarly, the panel 43 will include opposed beveled lateral edges 43a, 43b exposing the individual plies thereof.

As noted previously, the caul 10 will define a three-dimensional profile which conforms to the profile of the integrated composite component 40 being fabricated, including the forming mandrels 44a, 44b and the exposed edge plies at the opposed beveled lateral edges 42a-2', 42b-2' of the stringers 42a, 42b and the exposed edge plies at the opposed beveled lateral edges 43a, 43b of the panel 43, respectively, that may be needed during the fabrication process. Opposed downwardly and outwardly inclined sections 16a, 16b of the side wall 16 will thus be in contact with the exposed edge plies at the beveled opposed beveled lateral edges 42a-2', 42b-2' of the stringers 42a, 42b and the exposed edge plies at the opposed beveled lateral edges 43a, 43b of the panel 43, respectively, so as to protect the individual plies during the curing process. Thus, the caul 10 can be positioned over the preform component 40 prior to being placed within a vacuum curing bag (noted by the dashed line 52) sealed against the tooling 50 by means of edge seals 54. The preform component 40 can then be subjected to otherwise conventional elevated temperature (and typically elevated pressure) curing techniques. Once curing has been completed, the component 40 can be removed from the vacuum bag 52. The curing caul 10 and the curing mandrels 44a, 44b may each be separated from the component 40 for reuse in fabricating a similarly shaped component. It will be understood of course that separate curing cauls 10 will be required for components having different shapes and/or cross-sectional profiles since each caul 10 will be required to conform to the specific cross-sectional profile of the component to be cured.

Various modifications within the skill of those in the art may be envisioned. Therefore, while the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope thereof.

What is claimed is:

1. A curing assembly for forming an integrated composite component comprising a composite component preform formed of curable resin fiber-reinforced plies and a curing caul covering the component preform, wherein
(A) the composite component preform comprises:
    (i) a base panel formed of curable resin fiber-reinforced plies;
    (ii) a pair of mirror image opposed L-shaped stringers formed of curable resin fiber-reinforced plies and having respective opposed lower leg sections having opposed lateral beveled edges positioned adjacent the base panel and upright leg sections defining upper edges of the stringers extending upwardly from the base panel, and
    (iii) a pair of mirror image curing mandrels having downwardly and outwardly inclined exterior surfaces; and wherein
(B) the curing caul comprises a one-piece three-dimensional resiliently shape-retentive fiber-reinforced body comprised of a fibrous sheet embedded within at least one layer of a cured elastomeric resin, wherein the elastomeric resin is a room temperature vulcanizing (RTV) silicone rubber having a coefficient of thermal expansion when cured of at least $1.0 \times 10^{-4}/°$ C., and wherein the shape-retentive fiber-reinforced body includes:
    (i) a stiffened perimetrical edge region adapted for placement against the base panel of the composite component preform;
    (ii) a stiffened ridge region vertically spaced from the stiffened perimetrical edge region adapted for placement against the upper edges of the L-shaped stringers; and
    (iii) a pair of opposed resiliently compliant sides extending downwardly and outwardly between the stiffened ridge region and the perimetrical edge region, wherein the compliant sides are positioned against the downwardly and outwardly inclined exterior surfaces of the curing mandrels and against the opposed lateral beveled edges of the lower leg sections of the opposed L-shaped stringers, and wherein the elastomeric resin of the shape-retentive fiber-reinforced body undergoes volume expansion during high temperature curing of the composite component to exert sufficient additional pressure against the composite component preform during curing and prevent post-cure non-conformance of the upper and opposed lateral beveled edges of the L-shaped stringers.

2. The curing assembly as in claim 1, wherein the RTV silicone rubber has a coefficient of thermal expansion when cured of between about $2.5 \times 10^{-4}/°$ C. to about $1.0 \times 10^{-3}/°$ C.

3. The curing assembly as in claim 1, further comprising an intermediate panel between the base panel and the lower leg sections of the opposed L-shaped stringers.

4. The curing assembly as in claim 3, wherein the intermediate panel comprises opposed lateral beveled edges wherein are in contact with the downwardly and outwardly opposed resiliently compliant sides of the curing caul.

5. The curing assembly as in claim 1, further comprising tooling supporting the composite component preform and the curing caul.

6. The curing assembly as in claim 5, further comprising a vacuum bag covering the composite component preform and the curing caul.

7. The curing assembly as in claim 6, further comprising edge seals sealing the vacuum curing bag against the tooling.

8. A curing assembly for forming an integrated composite component comprising:
(A) a composite component preform which comprises:
    (i) a base panel formed of curable resin fiber-reinforced plies;
    (ii) a pair of mirror image opposed L-shaped stringers formed of curable resin fiber-reinforced plies and having respective opposed lower leg sections having opposed lateral beveled edges positioned adjacent the base panel and upright leg sections defining upper edges of the stringers extending upwardly from the base panel, and
    (iii) a pair of mirror image curing mandrels having downwardly and outwardly inclined exterior surfaces; and
(B) a curing caul covering the composite component preform which includes a shape-retentive fiber-reinforced body comprising:
    (i) a perimetrical edge region adapted for placement against the base panel of the composite component preform;
    (ii) a ridge region vertically spaced from the perimetrical edge region adapted for placement against the upper edges of the L-shaped stringers; and
    (iii) a pair of opposed resiliently compliant sides extending downwardly and outwardly between the ridge region and the perimetrical edge region, wherein the compliant sides are positioned against the downwardly and outwardly inclined exterior surfaces of the curing mandrels and against the opposed lateral beveled edges of the lower leg sections of the opposed L-shaped stringers.

9. The curing assembly as in claim 8, further comprising an intermediate panel between the base panel and the lower leg sections of the opposed L-shaped stringers.

10. The curing assembly as in claim 9, wherein the intermediate panel comprises opposed lateral beveled edges wherein are in contact with the downwardly and outwardly opposed resiliently compliant sides of the curing caul.

11. The curing assembly as in claim 8, further comprising tooling supporting the composite component preform and the curing caul.

12. The curing assembly as in claim 11, further comprising a vacuum bag covering the composite component preform and the curing caul.

13. The curing assembly as in claim 12, further comprising edge seals sealing the vacuum curing bag against the tooling.

14. The curing assembly as in claim 13, wherein the curing caul comprises a one-piece three-dimensional resiliently shape-retentive fiber-reinforced body comprised of a fibrous sheet embedded within at least one layer of a cured elastomeric resin, wherein the elastomeric resin is a room temperature vulcanizing (RTV) silicone rubber having a coefficient of thermal expansion when cured of at least $1.0 \times 10^{-4}/°$ C.

15. The curing assembly as in claim 8, wherein the RTV silicone rubber has a coefficient of thermal expansion when cured of between about $2.5 \times 10^{-4}/°$ C. to about $1.0 \times 10^{-3}/°$ C.

16. A method of fabricating a cured fiber-reinforced integrated composite component comprising:
    (a) providing a curing assembly as in claim 8; and (b) subjecting the composite component preform of the curing assembly to high temperature curing conditions to cause the volume expansion of the curing caul during the high temperature curing conditions of the composite component preform and thereby exert sufficient additional pressure against the composite component preform during curing to prevent post-cure non-conformance of the upper edges and the opposed beveled lateral edges of the L-shaped stringers thereby forming the cured fiber-reinforced integrated composite component.

17. The method as in claim 16, further comprising positioning a vacuum bag over the preform composite component and subjecting the preform composite component to vacuum during curing according to step (b).

18. The method as in claim 17, further comprising sealing the vacuum bag against tooling on which the composite component preform is supported.

\* \* \* \* \*